May 10, 1927. 1,627,600
J. F. GAIL
MANUFACTURE OF COMPOUND HELICAL WIRE SPRINGS
Filed June 26, 1922   16 Sheets-Sheet 2

May 10, 1927.

J. F. GAIL 1,627,600

MANUFACTURE OF COMPOUND HELICAL WIRE SPRINGS

Filed June 26, 1922  16 Sheets-Sheet 6

May 10, 1927.

J. F. GAIL 1,627,600

MANUFACTURE OF COMPOUND HELICAL WIRE SPRINGS

Filed June 26, 1922     16 Sheets-Sheet 7

Inventor.
John F. Gail.
By: Fisher Towle Clapp & Straus
Attys.

May 10, 1927.

J. F. GAIL 1,627,600

MANUFACTURE OF COMPOUND HELICAL WIRE SPRINGS

Filed June 26, 1922      16 Sheets-Sheet 9

Inventor.
John F. Gail.
By: Fisher Towle Clapp & Soans
Attys.

May 10, 1927.  1,627,600
J. F. GAIL
MANUFACTURE OF COMPOUND HELICAL WIRE SPRINGS
Filed June 26, 1922 16 Sheets-Sheet 10
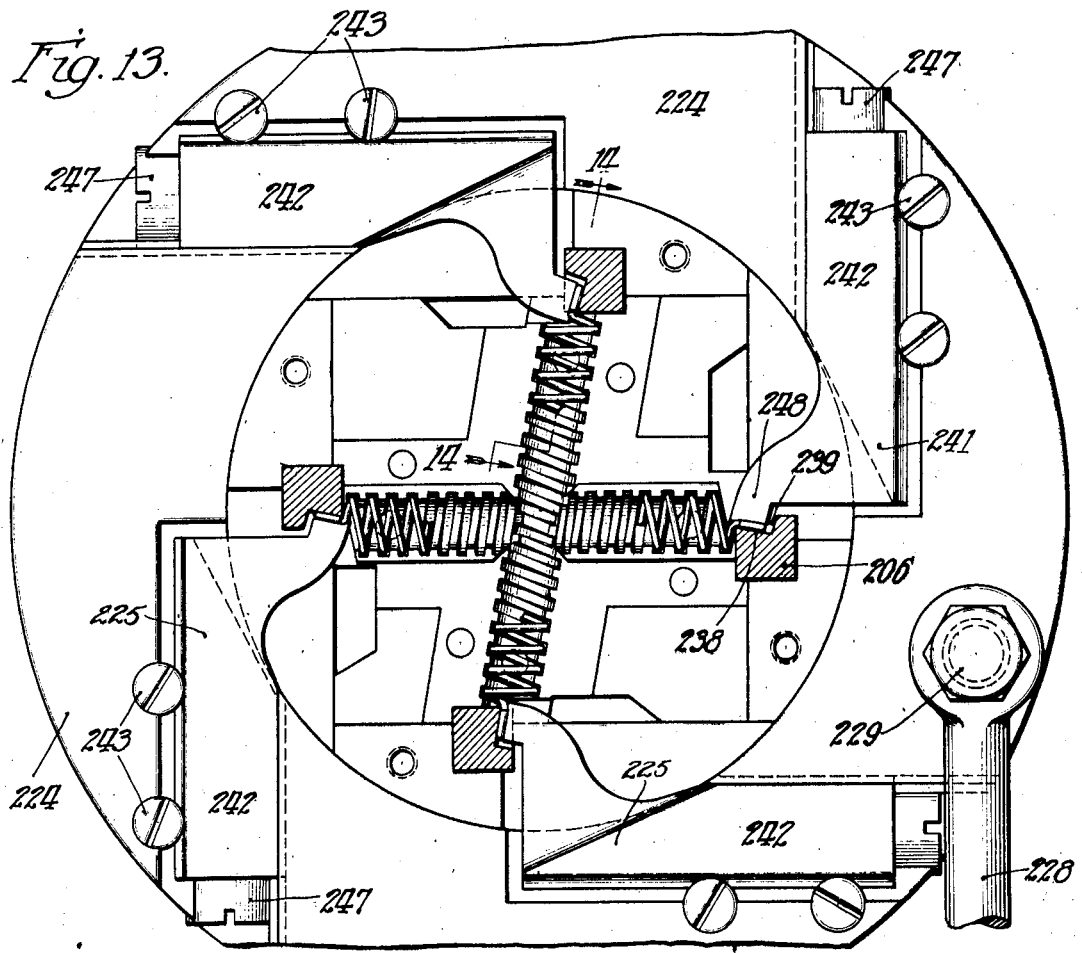
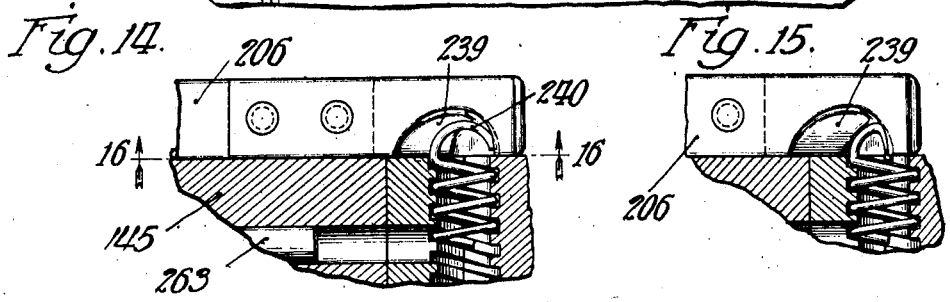
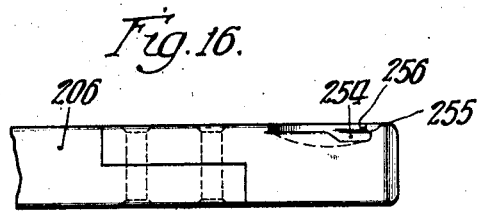
Inventor:
John F. Gail.
By: Fisher Towle Clapp & Soans
Attys.

May 10, 1927.

J. F. GAIL 1,627,600

MANUFACTURE OF COMPOUND HELICAL WIRE SPRINGS

Filed June 26, 1922     16 Sheets-Sheet 11

Inventor
John F. Gail.
By: Fisher Towle Clapp & Soans
Attys.

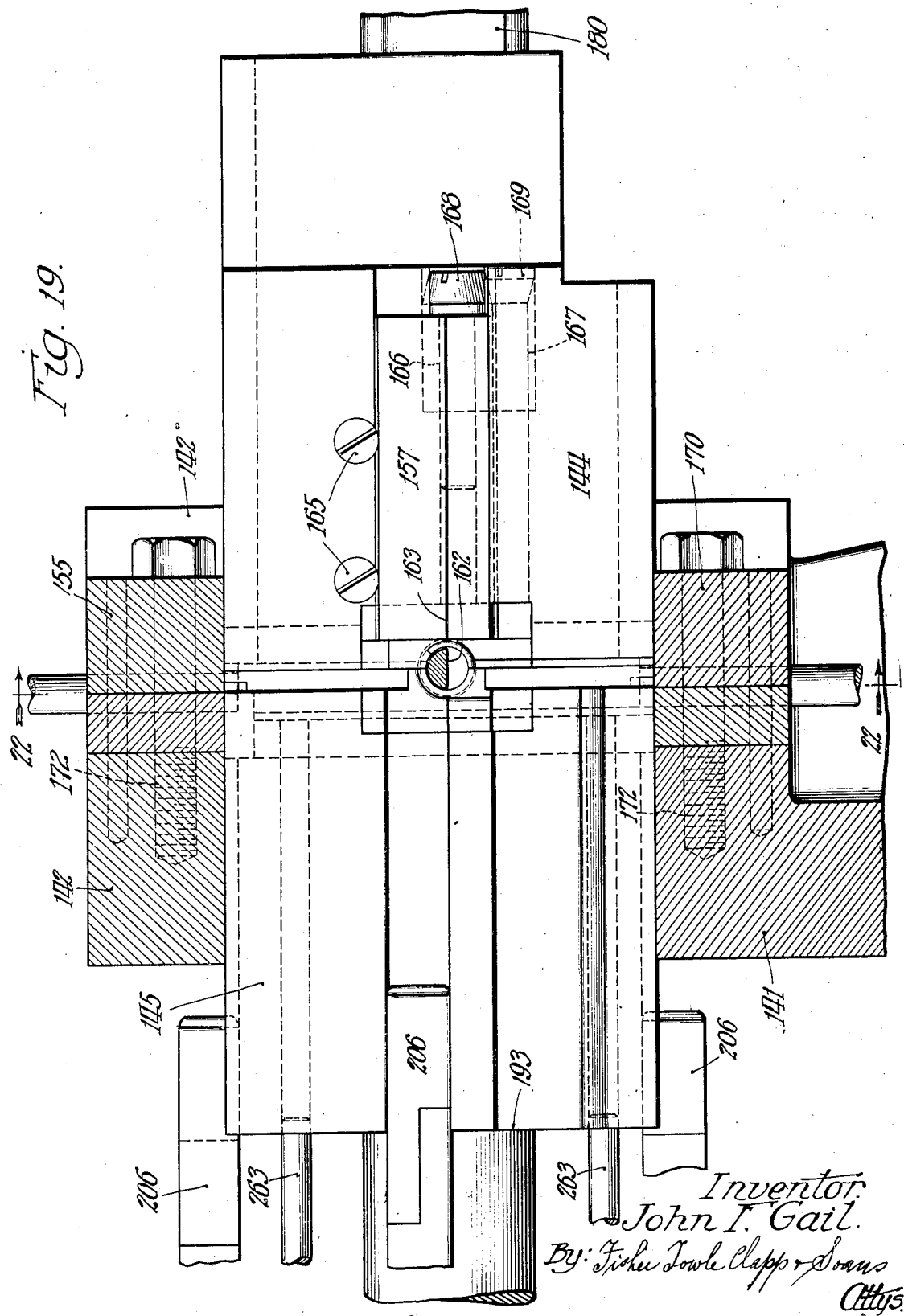

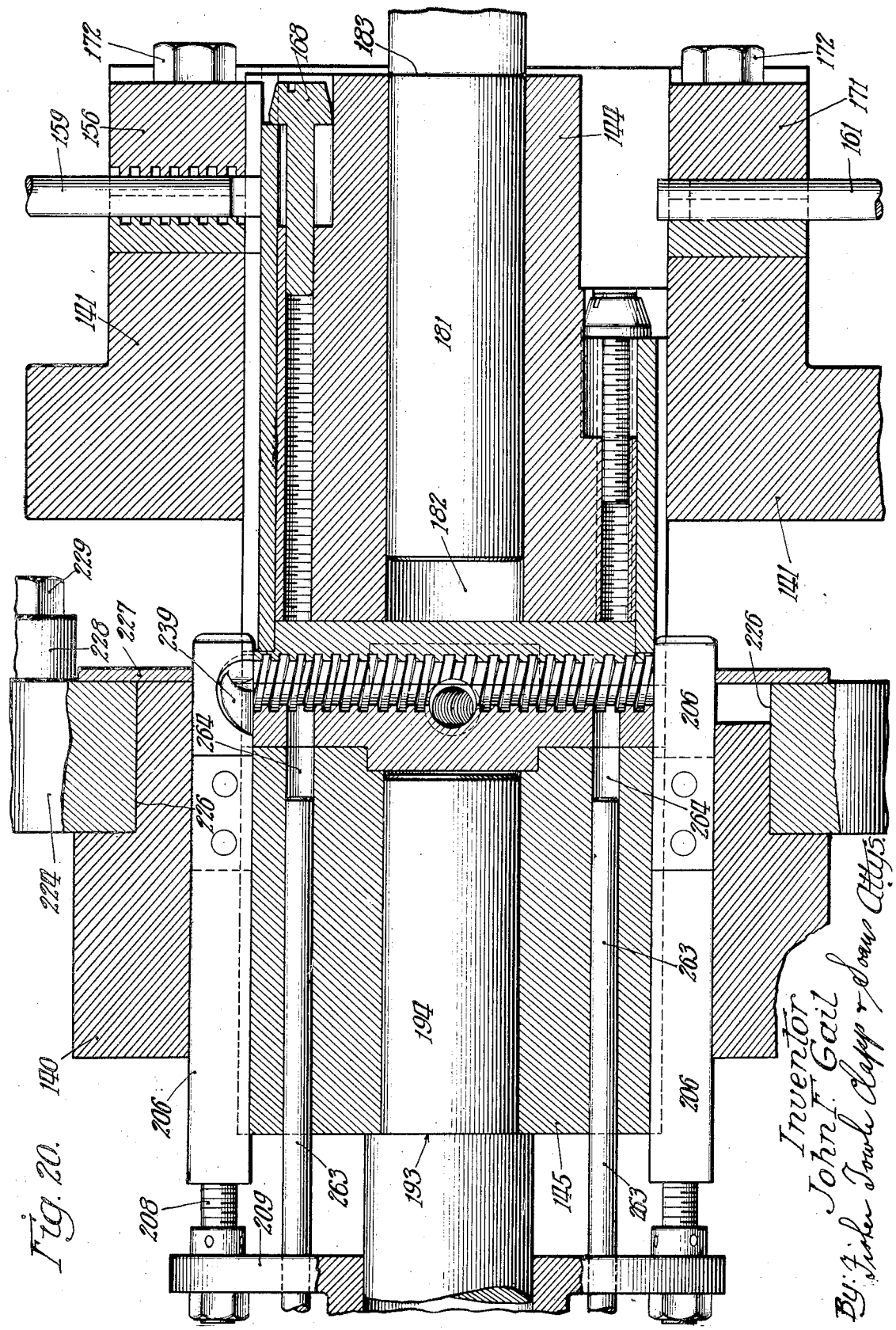

May 10, 1927. 1,627,600
J. F. GAIL
MANUFACTURE OF COMPOUND HELICAL WIRE SPRINGS
Filed June 26, 1922 16 Sheets-Sheet 14
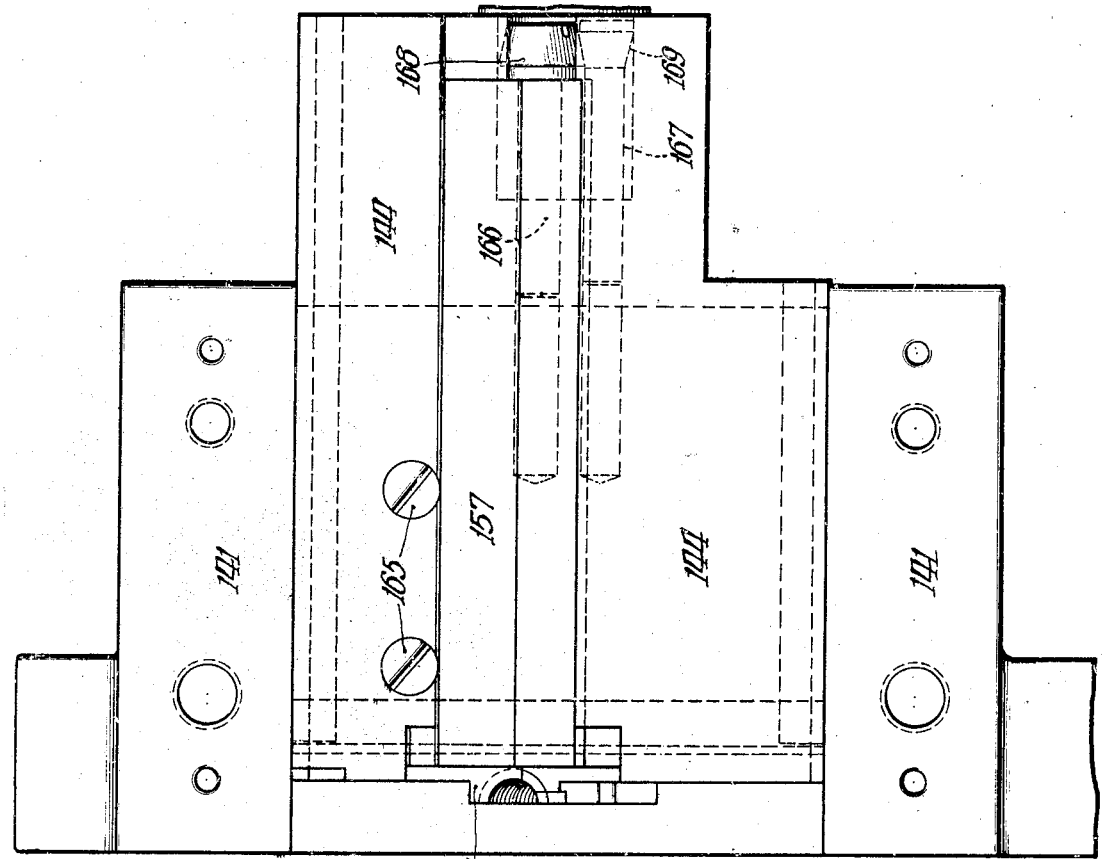
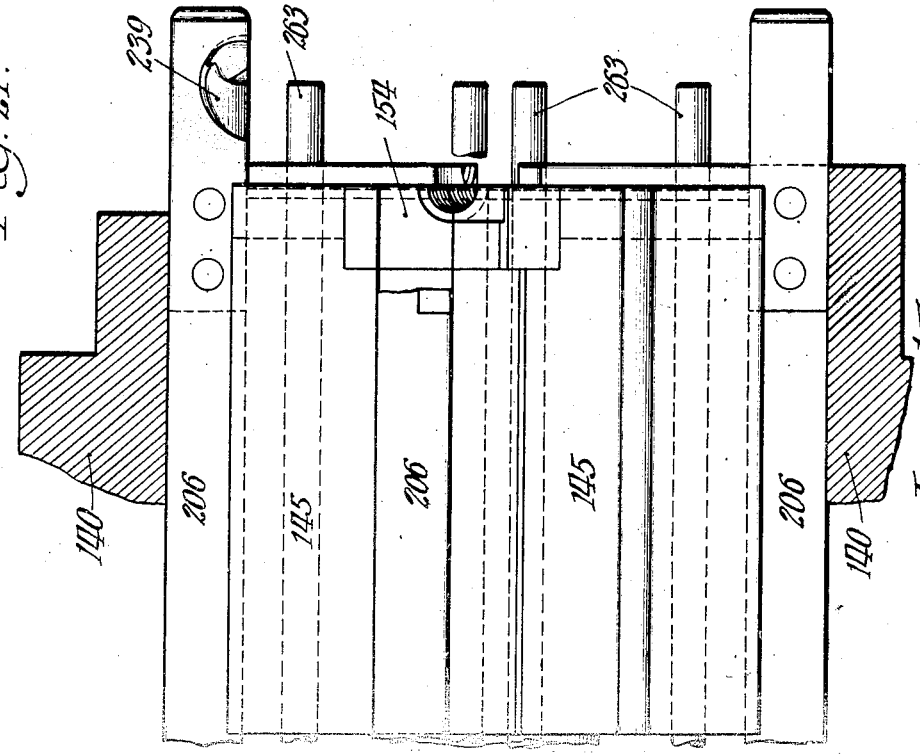
Inventor
John F. Gail
By Fisher, Clapp & Jones Attys May 10, 1927.
J. F. GAIL
1,627,600
MANUFACTURE OF COMPOUND HELICAL WIRE SPRINGS
Filed June 26, 1922    16 Sheets-Sheet 15
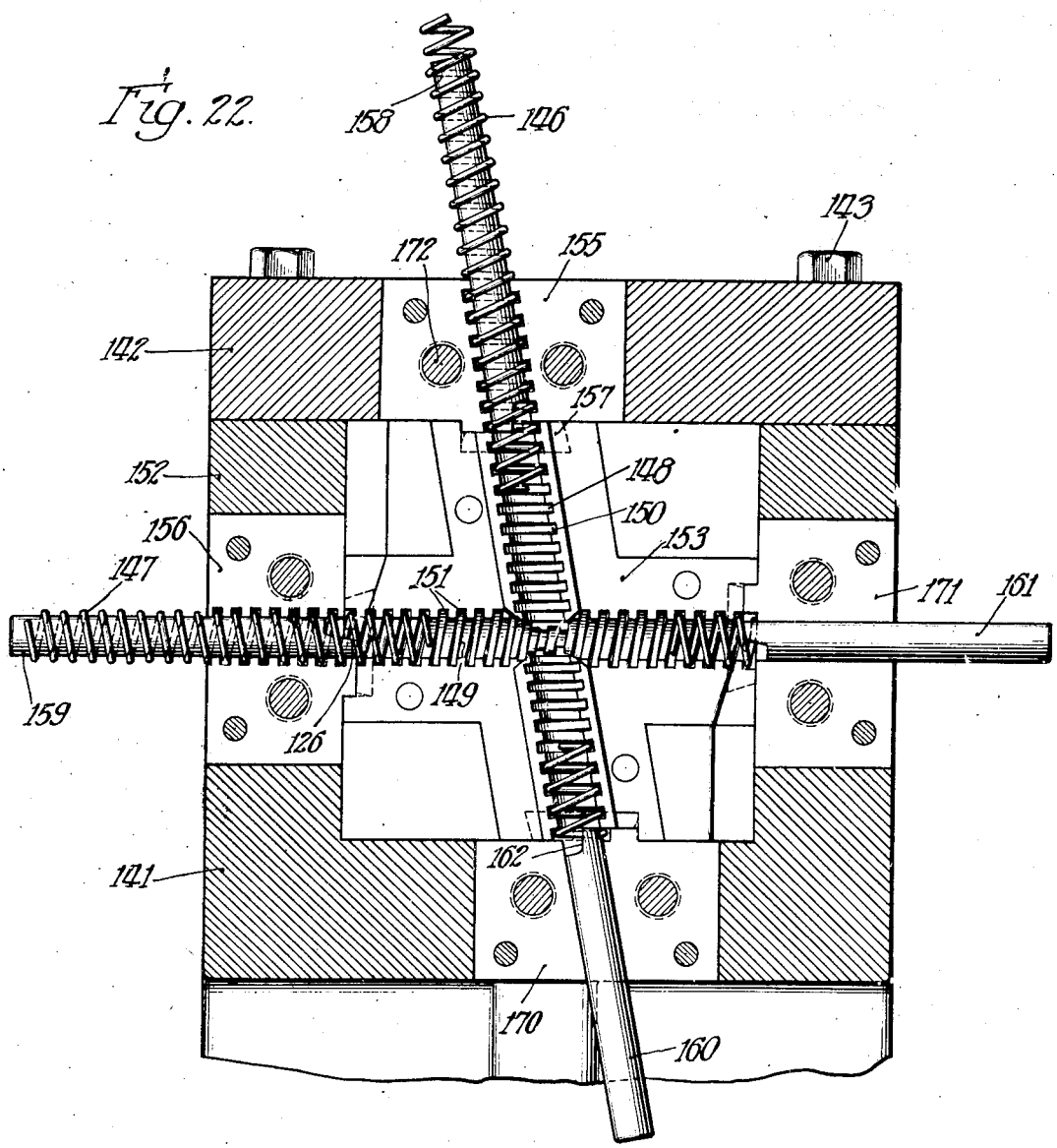
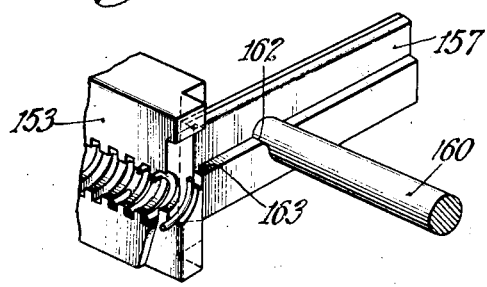
Inventor.
John F. Gail.
By: Fisher Towle Clapp + Soans
Attys May 10, 1927.
J. F. GAIL
1,627,600
MANUFACTURE OF COMPOUND HELICAL WIRE SPRINGS
Filed June 26, 1922    16 Sheets-Sheet 16
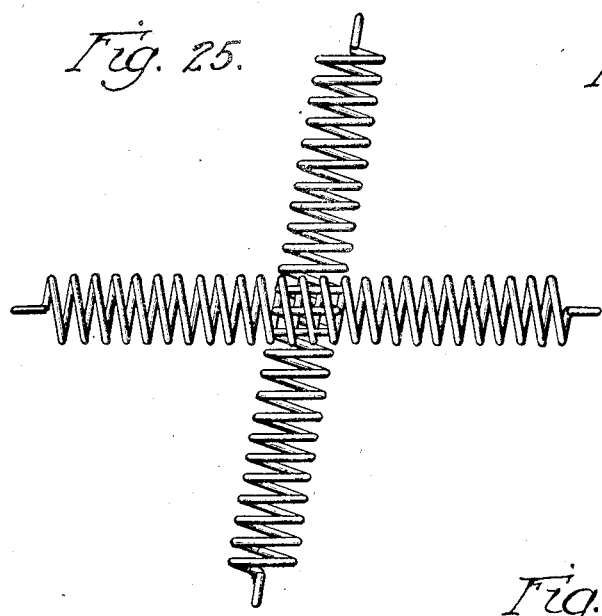
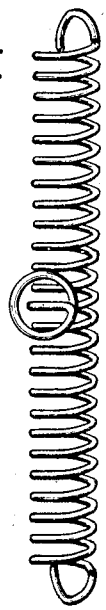
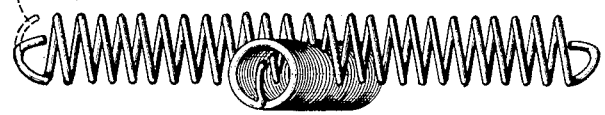
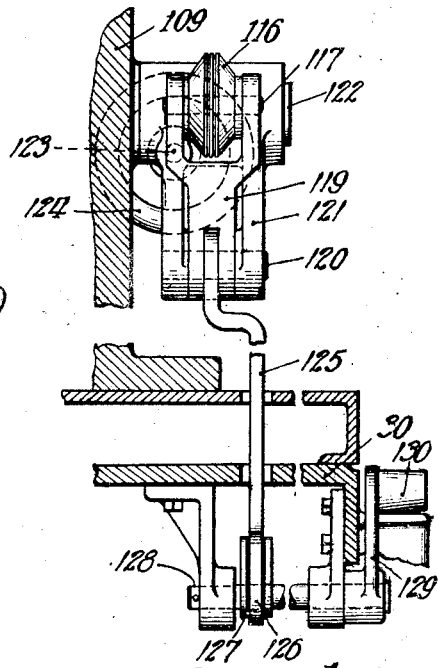
Inventor
John F. Gail.
By Fisher Towle Clapp & Soans
Attys.

Patented May 10, 1927.

1,627,600

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

MANUFACTURE OF COMPOUND HELICAL WIRE SPRINGS.

Application filed June 26, 1922. Serial No. 570,980.

My invention relates to improvements in the manufacture of compound helical wire springs and has its most useful application in the making of linked pairs of helicals interlaced together in substantially cruciform relation. Said cross helicals are often used in the construction of bed bottoms of the coiled spring type.

The primary object of the invention is to provide an improved process and apparatus for the manufacture of compound helicals of the above described type. Further objects of the invention are set out in the following specification and more particularly specified in the appended claims.

Figure 1:
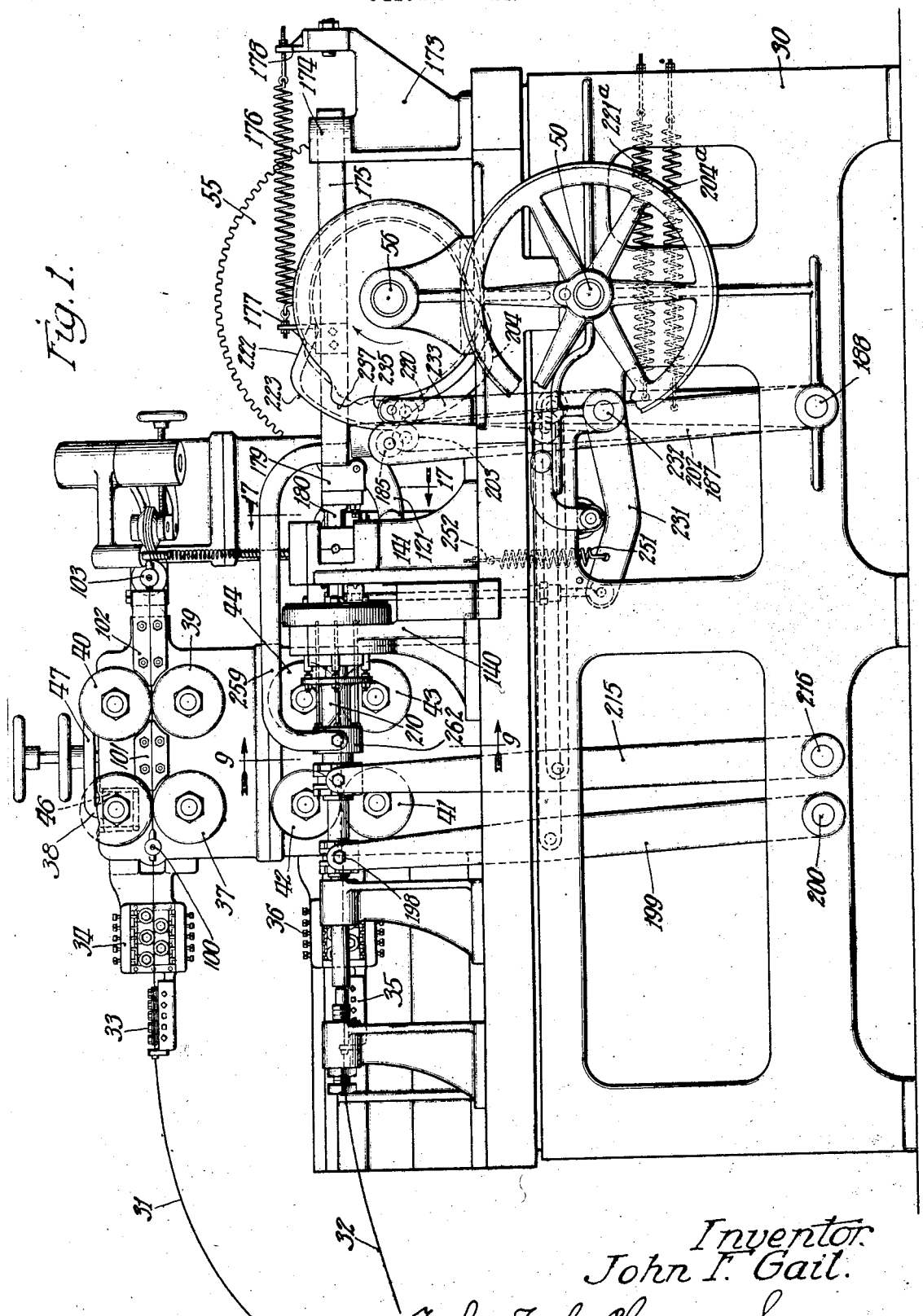
Figure 2:
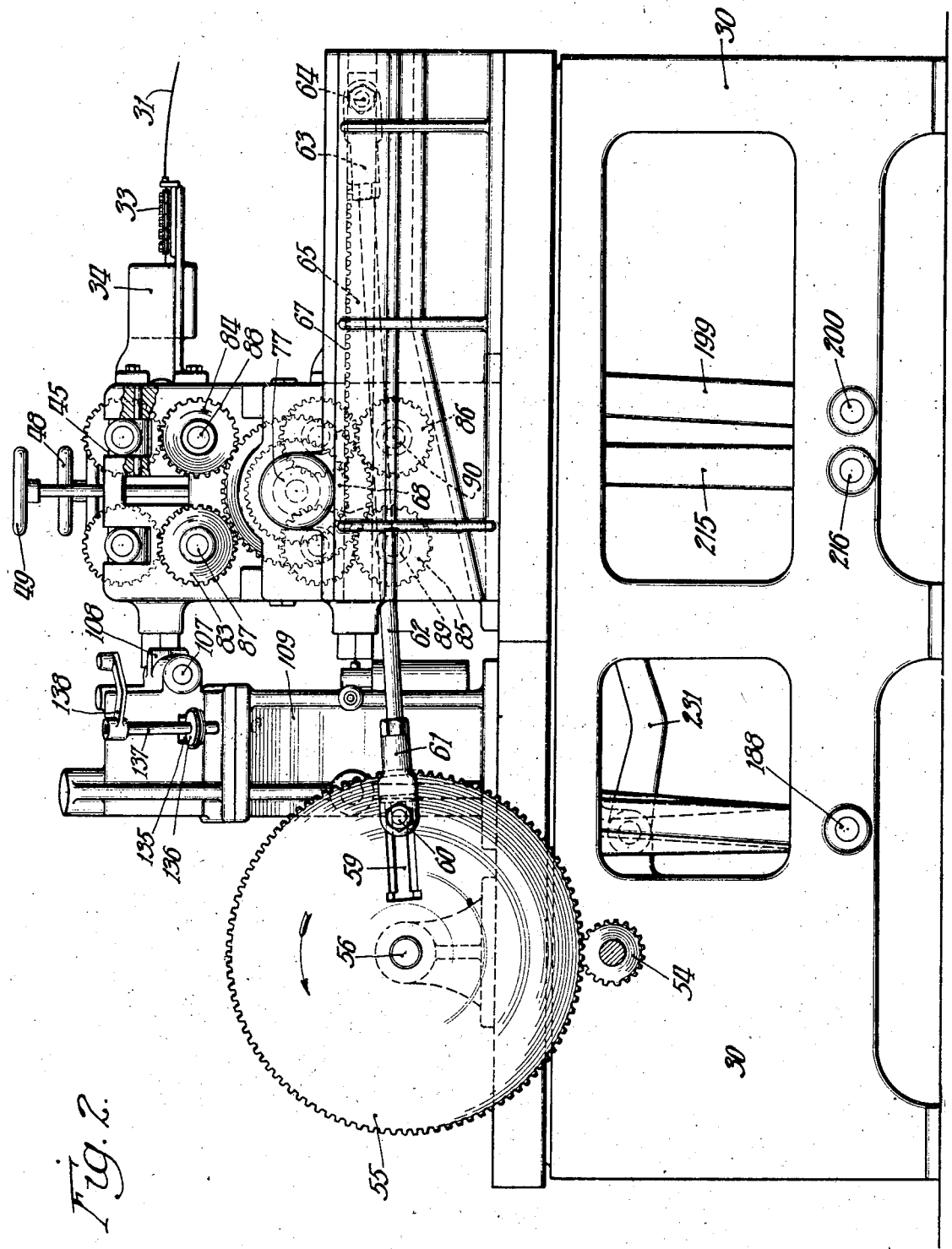
Figure 3:
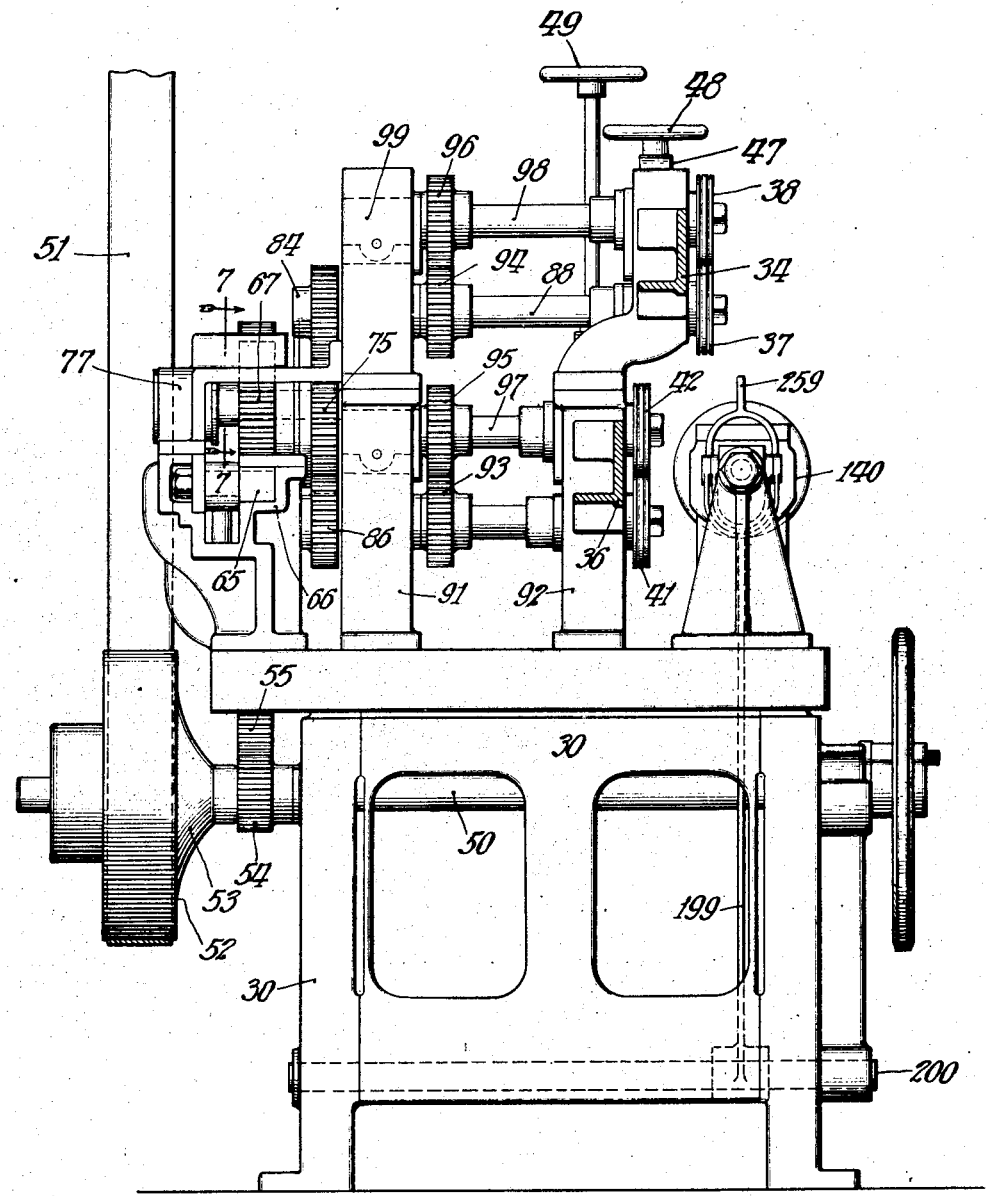
Figure 4:
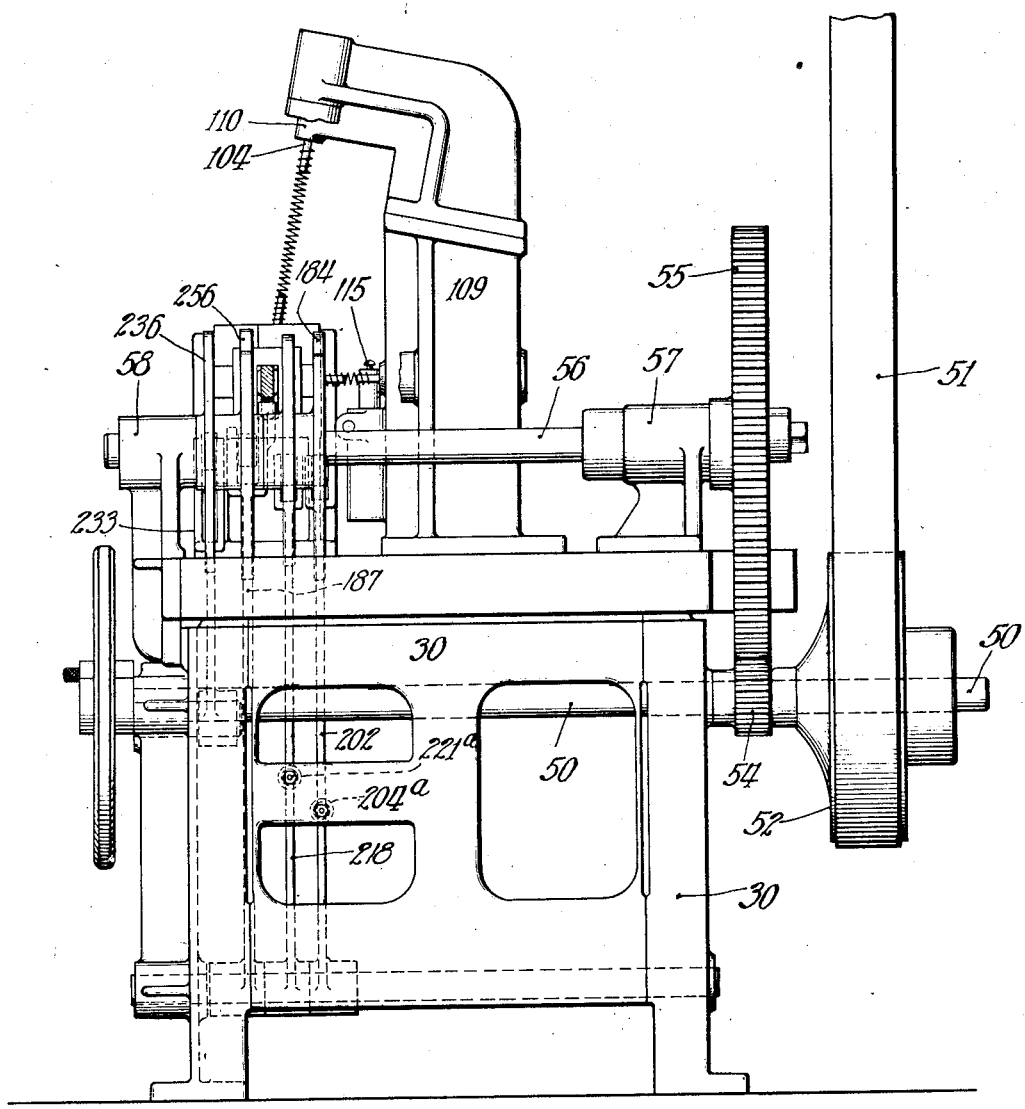
Figure 5:
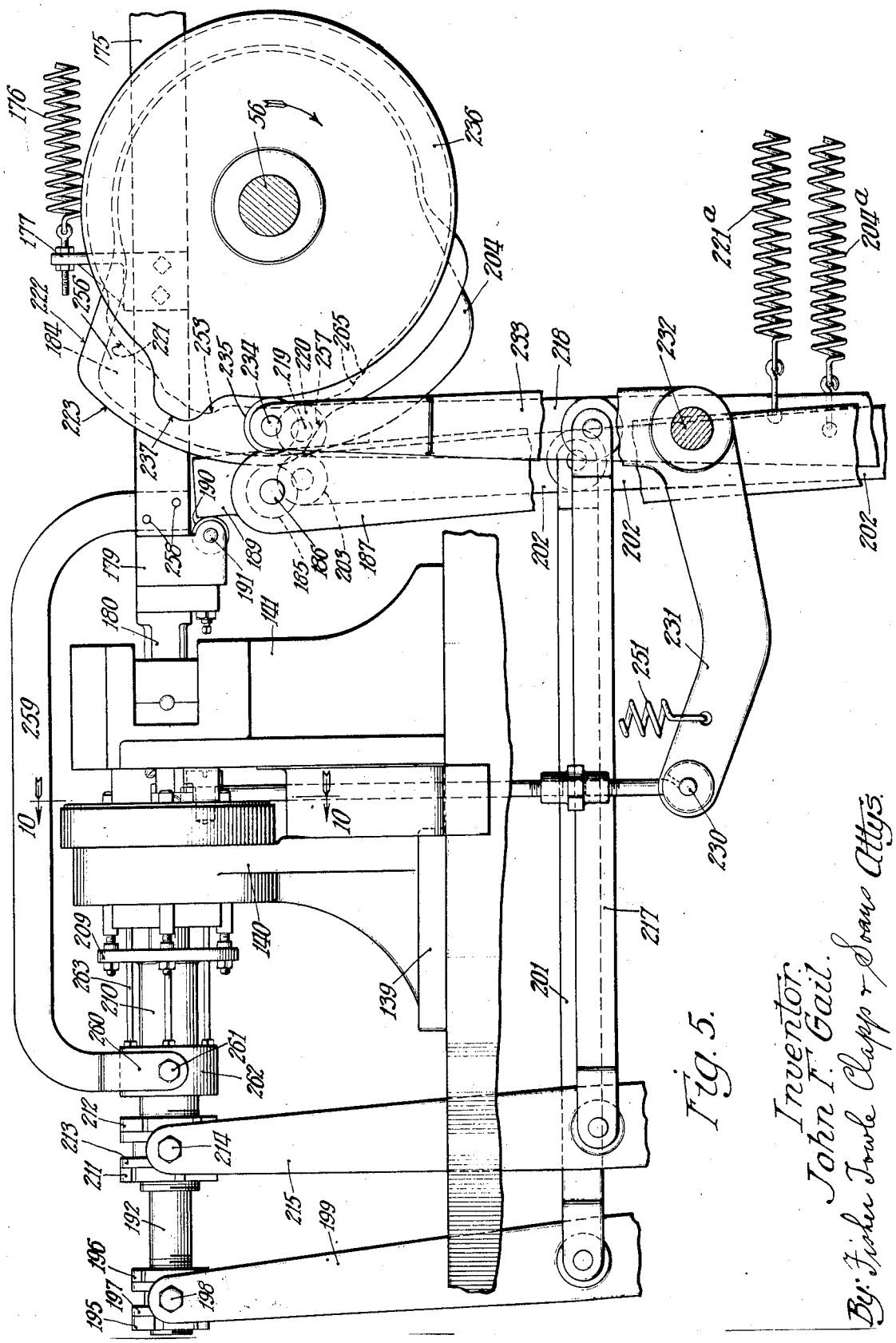
Figure 6:
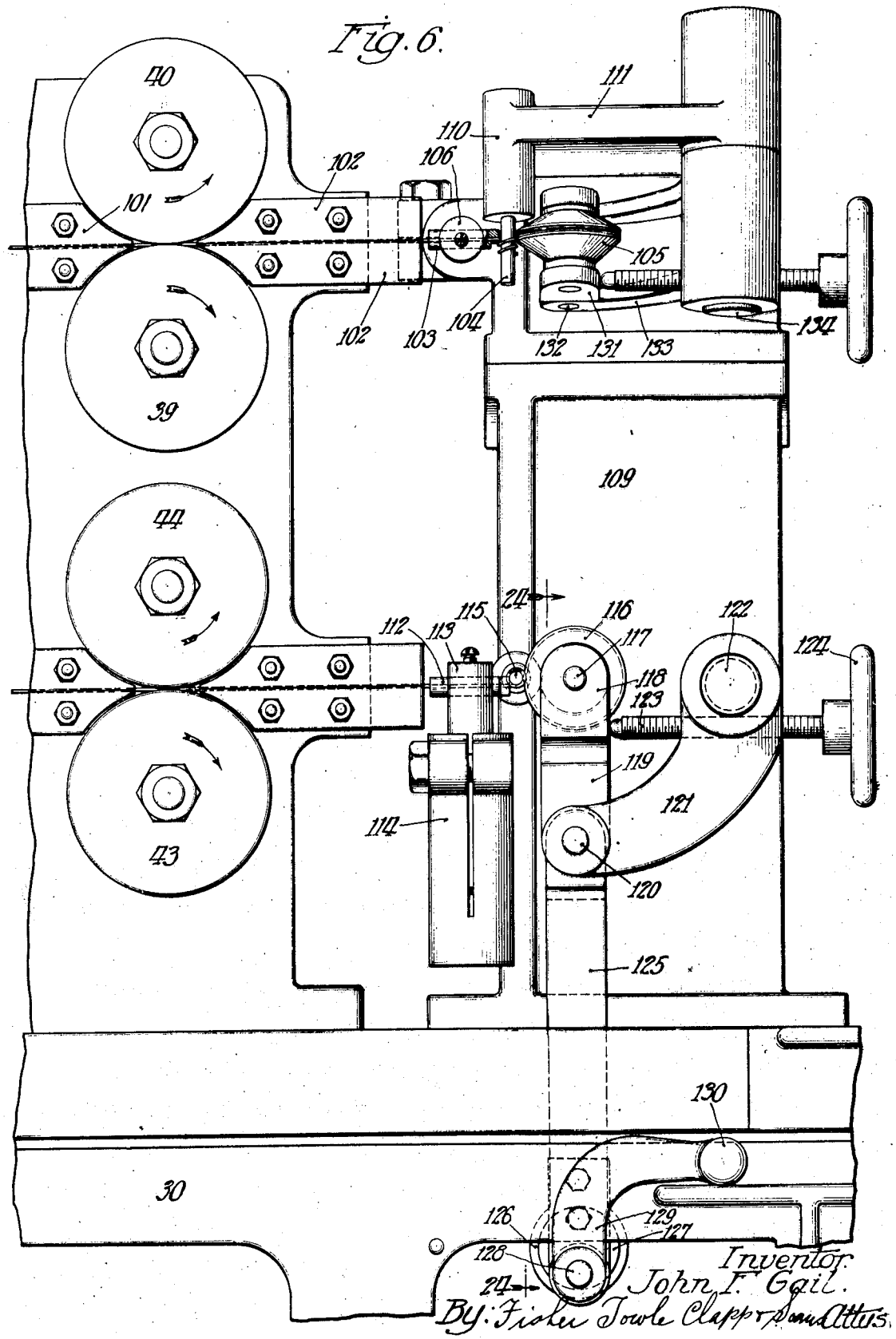
Figure 7:
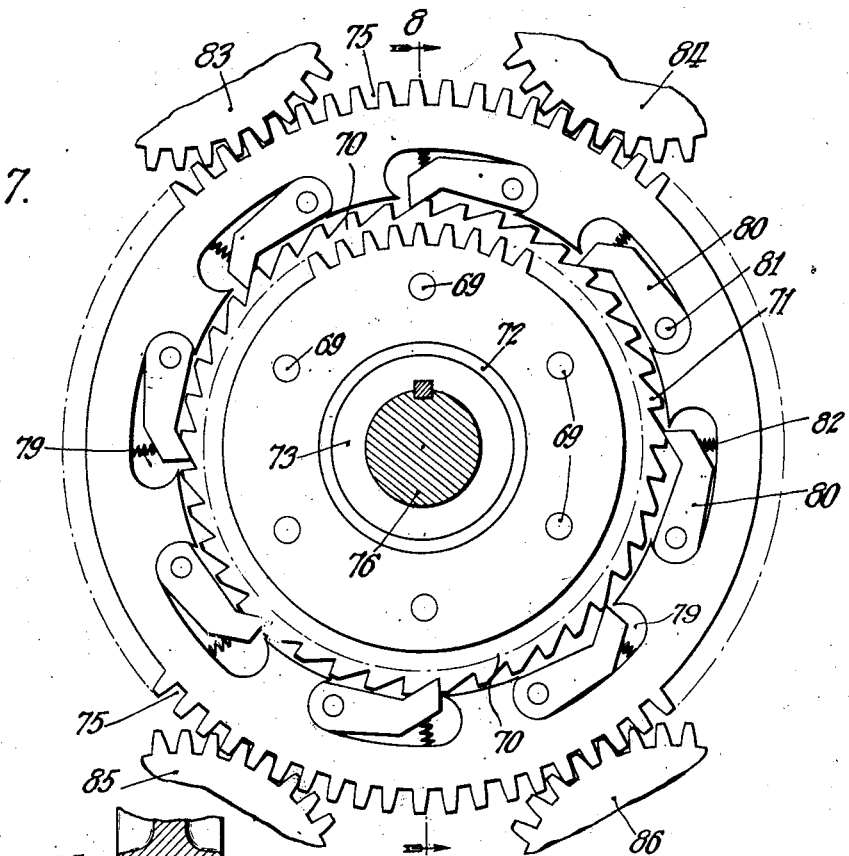
Figure 8:
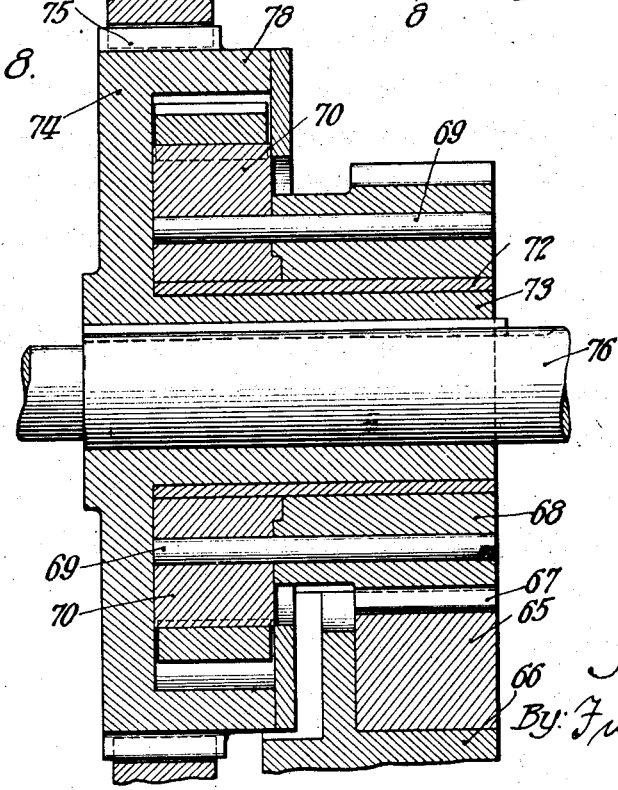
Figure 9:
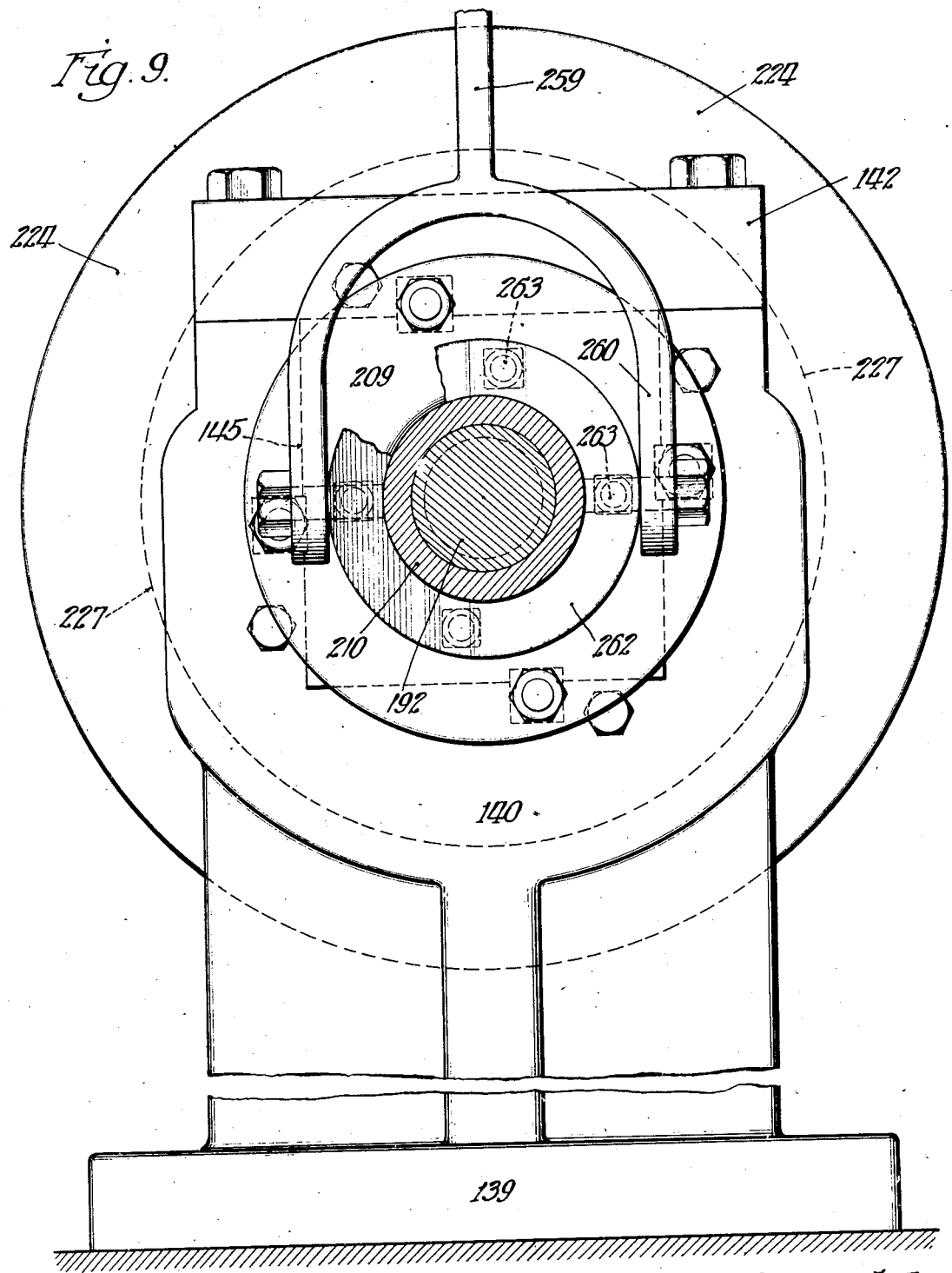
Figure 10:
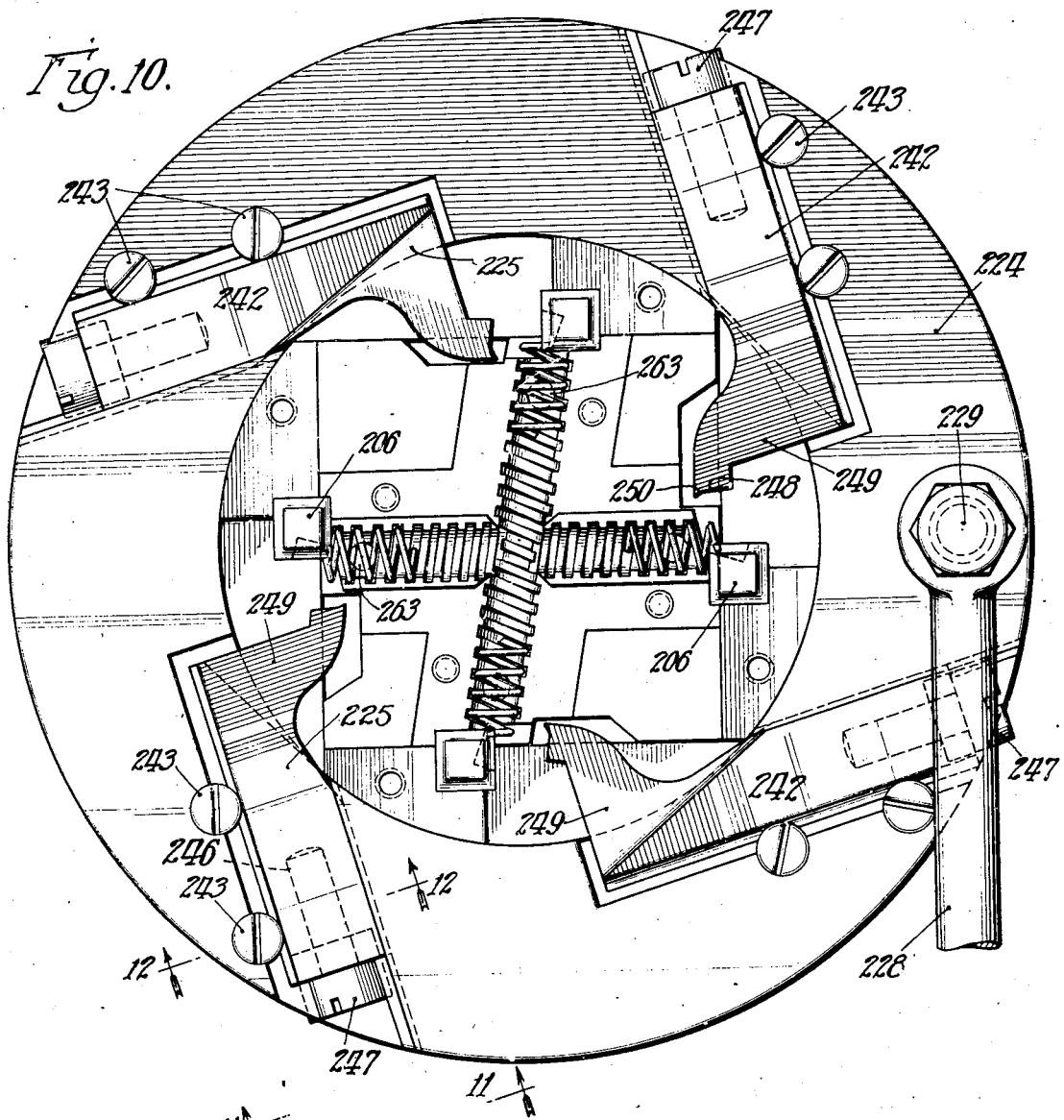
Figure 11:
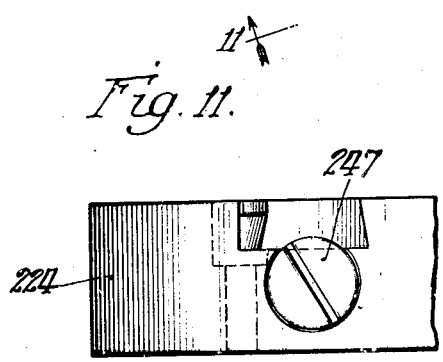
Figure 12:
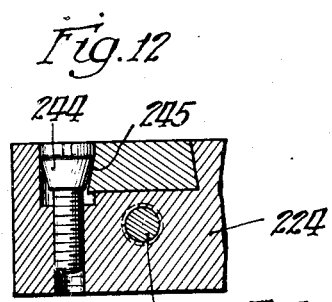
Figure 17:
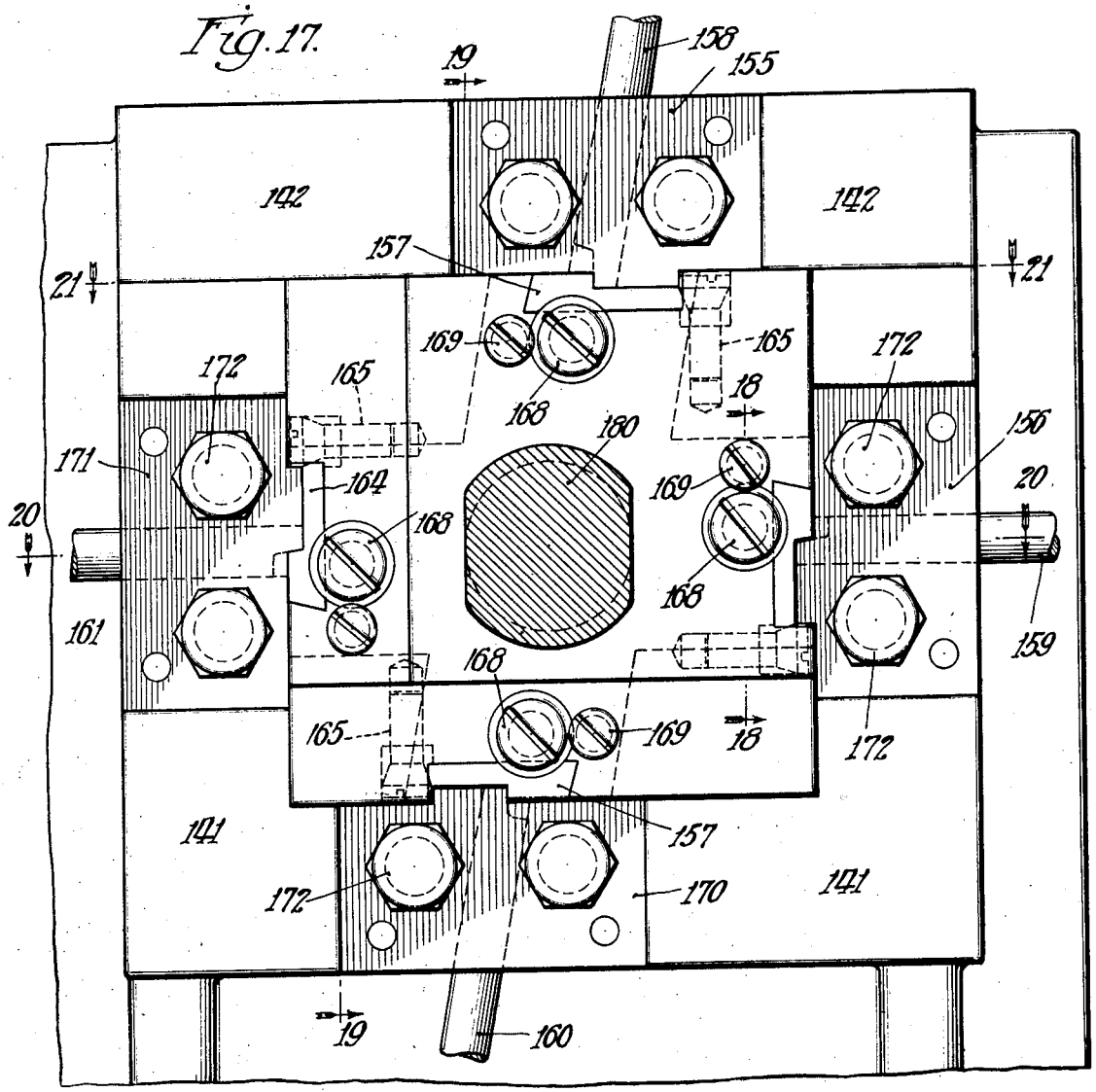
Figure 18:
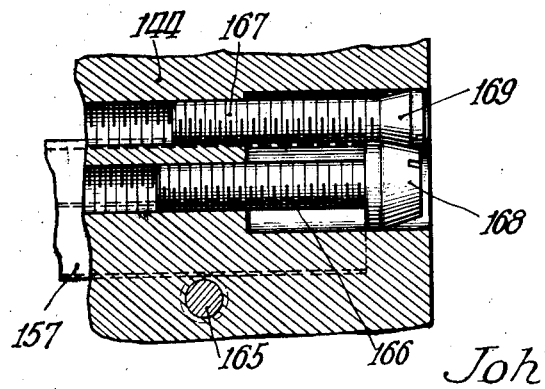

In the drawings which illustrate my invention as applied to a machine for making cross helicals, Fig. 1 is a side elevation of the complete machine, Fig. 2 is a side elevation of the opposite side of the same machine, Fig. 3 is a rear end elevation of the machine, partially in section, Fig. 4 is a front end elevation of the machine, Fig. 5 is an enlargement of a portion of Fig. 1, certain parts of the apparatus being broken away for the sake of clearness, Fig. 6 is also an enlargement of a portion of Fig. 1, Fig. 7 is a sectional elevation taken on the line 7—7 of Fig. 3, Fig. 8 is a section taken on the line 8—8 of Fig. 7, Fig. 9 is a section taken on the line 9—9 of Fig. 1, Fig. 10 is an elevation of the left hand die portion, Fig. 11 is a fragmentary view looking in the direction of line 11—11 on Fig. 10, Fig. 12 is a section taken on the line 12—12 of Fig. 10, Fig. 13 is a view similar to Fig. 10, but showing the parts in a somewhat different position, Fig. 14 is a section taken on the line 14—14 of Fig. 13, Fig. 15 is a view similar to Fig. 14, but showing the parts in a subsequent position, Fig. 16 is a section taken on the line 16—16 of Fig. 14, Fig. 17 is a section taken on the line 17—17 of Fig. 1, Fig. 18 is a section taken on the line 18—18 of Fig. 17, Fig. 19 is a section taken on the line 19—19 of Fig. 17, Fig. 20 is a section taken on the line 20—20 of Fig. 17, Fig. 21 is a section taken on the line 21—21 of Fig. 17, Fig. 22 is a section taken on the line 22—22 of Fig. 19, Fig. 23 is a fragmentary perspective showing the arrangement of one of the cutting off knives or shears, Fig. 24 is a section taken on the line 24—24 of Fig. 6, Fig. 25 is a plan view of the cross helical wire spring which is the product of the machine, Fig. 26 is a side elevation of the compound spring shown in Fig. 25, and Fig. 27 is an end elevation of the said spring.

Referring to the drawings, 30 represents the main frame or base casting upon which the various operating parts of the apparatus are mounted or carried. It will be understood that I have not illustrated, nor do I intend to describe the two reels or their supports which carry and deliver or pay out the continuous wire supplies 31 and 32, from which the twinned helicals are constructed by the machine. The continuous wire length 31 enters the machine through a pair of conventional straightening devices 33 and 34 arranged at right angles in the customary manner, and the wire length 32 is straightened by a similar pair of straightening devices 35 and 36.

Each of the wires 31 and 32 is propelled forward during the feeding or forming stroke of the machine by means of two pairs of grip rolls or feed rolls. The upper wire 31 is fed forward by the feed rolls 37, 38, 39 and 40, while the lower wire 32 is fed forward by the feed rolls 41, 42, 43 and 44. As shown best in Figs. 1, 2 and 3, the upper rolls 38 and 40 of the pairs which drive the upper wire 31 are mounted to rotate in square boxes vertically slidable in slots or rectangular notches as at 45, said square boxes 46 being connected by a yoke member 47 which may be forced downwardly by a screw manually actuated by a handle 48. The faces of the rolls are turned to provide circumferentially extending semi-circular grooves arranged to grip the wire without unnecessarily flattening the same. The lower set of four rolls which drive the lower wire length 32 are similarly mounted and adapted for adjustment by means of the hand wheel 49.

All of the eight feed rolls for propelling the wire length 31 and 32 are simultaneously and positively driven by a train of gearing shown best in Figs. 2, 3, 4, 7 and 8. As shown in said Figs. 3 and 4, power is applied to the main power shaft 50 by means of a belt 51, pulley 52 and clutch mechanism 53, of any conventional type. Keyed to the shaft 50 there is a pinion 54 meshing with a large disk like spur gear 55 which is keyed to the outer end of the main cam shaft 56, said main cam shaft being mounted to rotate in suitable half bearings or pedestals 57 and 58, bolted to the top of the main frame 30. It will be manifest that whenever the machine is operating, the above driving gearing will serve to continuously rotate main cam shaft 56.

As shown best in Fig. 2, the disc gear 55 is made with a radial slot as shown at 59, in which slot there is arranged to be adjustably clamped a crank pin 60. There is journaled on said crank pin 60 the outer end 61 of a connecting rod 62, the other end 63 of which pivotally connects with a pin 64 secured in the side of a rack bar 65. Said rack bar 65 (see also Fig. 8) is supported to slide in suitable horizontal guide ways as at 66 and on its upper surface is equipped with rack teeth 67 meshing with the under side of a spur gear 68. The spur gear 68, by means of pins 69 is rigidly united with a coaxial ratchet gear 70 having 41 teeth 71. The unit comprising spur gear 68 and ratchet wheel 70 is bored out to revolve freely on a bushing 72 carried on a hub 73 of an annular housing 74 on the outer face of which there are formed gear teeth 75, the housing 74 thus also constituting a spur gear. The hub 73 of said housing 74 is keyed to a shaft 76 supported to rotate in suitable bearings as at 77. In the inner periphery of the flange bar 78 of the housing 74 there are formed a plurality of eight openings 79 which contain a series of eight ratchet pawls 80 mounted on pins 81 carried by the housing. Said pawls 80 are held in engagement with the teeth 71 of the ratchet wheel by means of springs 82. It will be manifest that by reason of there being eight pawls and 41 teeth in the ratchet wheel, that is to say, a number exceeding by one tooth a multiple of the number of pawls, during a complete revolution of the ratchet wheel within the housing, there will be 41 multiplied by eight equals 328 spaced positions in which the ratchet wheel will be engaged and locked against clockwise rotation relative to the housing by said series of pawls. In other words, the effect is the same as though there were a single pawl provided on the housing and 328 teeth on the ratchet wheel, which large number of teeth of the required strength would not be feasible on a ratchet wheel of reasonable dimensions. The purpose of the ratchet arrangement is to cause the housing and gear 75 to be moved only in one direction by the reciprocatory movement of rack bar 65.

The gear 75 meshes with and drives directly the spur gears 83, 84, 85 and 86 respectively keyed to the roll shafts 87, 88, 89 and 90, said shafts being the lower shafts in each instance of the pairs of roll shafts which operate the wire feed rolls. Said roll shafts 87, 88, 89 and 90 are rotatably supported in suitable brackets 91 bolted to the top of main frame 30, and between said brackets 91 and 92, have keyed thereto spur gears as at 93 and 94, which spur gears 93 and 94 mesh with and drive similar spur gears 95 and 96 respectively keyed to the upper roll shafts as at 97 and 98. The upper roll shafts 97 and 98, in order to permit adjustment by the hand wheels 48 and 49 to effect necessary gripping action between the upper and lower rolls of the bars, are arranged to tilt, as previously described, the rear ends of same adjacent the driving gears, being supported in tilting bearing boxes as at 99.

The ratio of the train of gearing comprising rack gear 68, spur gear 75 and gears driven thereby, is such that all of the rolls are positively revolved at the same speed and a like amount during one-half of each revolution of the main cam shaft 56, while during the other portion of the revolution of said cam shaft 59, when the ratchet gear is driven in the reverse direction, the pawls 80 travel idly over the teeth of the ratchet and the movement of the feed rolls is controlled by the position of the crank pin 60 and is such as to feed the necessary amount of wire from which each helical is formed.

During its forward movement through the machine, each of the continuous wire lengths is guided by fixed guiding members as at 100, 101, 102 and 103, said guides being of type and construction well known to those skilled in the art of spring manufacture. Preferably, the final guide 103 which delivers the wire to the mandrel 104 and bending roll 105 (see Fig. 6) is made adjustable within a rotatable and longitudinally movable stud member 106 so that the wire end may be properly received from guide 102 and correctly presented to the mandrel 104 and bending roll 105. Said stud 106 is preferably equipped with a cylindrical supporting shank 107 clampingly supported in a split lug 108 projecting over the top of the supporting bracket 109. The bending mandrel 104 comprises a relatively short pin of a size to enter the coils of the helical, said pin being supported in a boss 110 on the end of an arm 111 carried by the upper end of bracket 109.

In a similar manner the lower wire 32 is conducted to and guided by a final tubular guide 112 carried in a stud 113 which is clamped in a split boss 114 formed as a part of the bracket 109. Said wire 32 is formed around a stationary bending mandrel 115 in cooperation with bending roller 116. Preferably, in order to facilitate manipulation of the machine, the bending rolls 105 and 116 are movable or retractable so as to free the wire when, for any reason, it is desired to run the wire through the machine without bending the same into a helical. To this end, the bending roll 116 is supported on a pin or shaft 117 extending across a fork 118 (see Figs 6 and 24). The shank 119 of said fork member 118 is pivotally carried by a pin 120 extending across the arms of a bifurcated member 121 pivoted on a horizontal stud 122 projecting from the bracket 109. Bending roll 116 is held up to its work and against the mandrel 115 by means of a screw 123, the point of which engages against one of the arms of fork 118, said screw being fitted within a hole tapped in the hub of the bifurcated member 121. A hand wheel 124 facilitates adjustment of screw 123 when it is desired to advance or retract the roll 116. Preferably, having secured a proper adjustment of the bending roll 116, said adjustment should be maintained, and therefore, I find it desirable to employ special means for releasing or shifting the bending roller 116 without changing its permanent adjustment, when it is desired to release the wire. To this end the position of pin 120 is controlled by a movable link 125 the upper end of which link is pivotally fitted on pin 120 while the lower end thereof is made with a strap portion 126 having a circular aperture fitting over an eccentric 127. Said eccentric 127 is fixed on the shaft 128 on which shaft 128 there is also rigidly keyed a lever 129 provided with a knob 130. It will be manifest that when the knob 130 and with it shaft 128 is swung through an angle of 180°, the eccentric 127 will draw down the link 125 a distance equal to twice the throw of the eccentric and hence pin 120 will swing down and move the bending roller 116 away from bending mandrel 115. Thus the wire can be released without disturbing the adjustment of screw 123.

In a similar manner the bending roll 105, which bends the upper wire 31 is carried in a bifurcated member 131, rocking on a pin 132 in the end of the bifurcated member 133, which swings on fixed stud 134. Pin 132 is connected by a strap 135 (see Fig. 2) to an eccentric 136 on a shaft 137, the lower end of which is pivoted in a hole drilled in bracket 109. On the upper end of shaft 137, there is keyed a hub of a handle 138 by which shaft 137 can be rotated to effect longitudinal movement of strap 135, and thus swing bifurcated member 133 rearwardly to move bending roll 105 away from the wire and mandrel 104.

As shown best in Fig. 4, the mandrels 104 and 115 are arranged, not at right angles exactly, but at about 80° of relative inclination, such angle corresponding with the angle between the axes of the completed helicals as shown in Fig. 25. The separate helical coils are formed around said mandrels in the ordinary way, as is well known to those skilled in the art, and the said coils, by reason of the pitch thereof, in their forward movements propel themselves toward the center of the die structure, which will now be described.

On the top of the main frame 30, there is bolted or otherwise suitably secured, a bracket 139, having spaced upper extensions 140 and 141. The right hand extension 141, as shown best in Fig. 22 has formed thereon a rectangular or square head portion provided with a cap 142, rigidly secured thereto as by cap screws 143. Said head portion is milled or planed out on the interior to form a horizontally extending channel or guideway of uniform square cross section so as to receive the sliding die block, also square in cross section to fit in and be guided by the housing 141. The die block, as perhaps shown best in Figs. 19, 20 and 21, is made in two parts, 144 and 145, the dividing plane between the die blocks 144 and 145 being at right angles to the direction of their sliding movement. In order to receive the helical coils 146 and 147 (see Fig. 22) the die block is made with a pair of transverse bores 148 and 149, in the walls of which are cut internal helical grooves, as at 150 and 151, the width and pitch corresponding with the diameter and pitch of the helical coils. The bore 148 and its groove are coaxial with and constitute extensions of a similar bore and groove provided in the cap portion 142, and a bore 149 and spiral groove 151 similarly constitute extensions of a similar bore, hole and spiral groove in the wall 152 of the housing. It will be understood that said helical bores and helical grooves which receive the springs 146 and 147 are aligned and coaxial with the corresponding mandrels 105 and 115, said axes crossing each other at an angle as shown in Fig. 22, substantially at the center of the die block, and being offset horizontally a distance equal to approximately half of the spring diameter, as shown best in Figs 20 and 21. The purpose of positioning the respective axes in different vertical planes slightly offset from one another and of having the axes inclined rather than perpendicular to each other, is to permit the coils to screw into each other and become properly interlaced or twinned, as indicated in Figs. 25, 26 and 27.

It will be observed that the die portions 144 and 145 are made with hardened facing blocks 154 and 154ᵃ, which may be removed and replaced, when excessive wear has occurred, and also that the entrances to the dies are made with similar removable portions as at 155 and 156.

The severing of each helical from its source of supply is effected after the two helicals have been helically propelled into the die block and while the rack bar 65 is making its back stroke, the feeding rolls then being stationary on account of the ratchet connection. The trimming of the forward end of each helical, in order to remove surplus wire, is also effected simultaneously with the severing of the helicals and by substantially similar mechanism. Said mechanism comprises a set of four shear blades as at 157 secured in the die block 144 and which, when the die block 144 is moved to the left, i. e., toward the other die block 145 cooperate with a set of four stationary knives. Said stationary knives take the form of steel shear pins 158, 159, 160 and 161, having cutting edges as at 162, which cooperate with the cutting edges 163 of the shears. As shown best in Figs. 17, 18, 19 and 23, each of the shear blades comprises a hardened steel bar 164 extending on the outside of the die block 144 parallel with the axis thereof and having a dove-tailed cross section to fit within a correspondingly formed channel or groove in the outside face of the die block 144. Each of said shear blades 164 is adjustably held in position by a pair of conical cap screws 165, the heads of which engage one of the dove-tailed edges of the shear blade 164. To facilitate adjustment and to position each shear blade longitudinally, I provide a stout cap screw 166 inserted in the end of the die block 144 coaxial therewith and having a head of sufficient diameter to overhang and engage the outside end of the shear blade 164 (see Fig. 17). In order to lock said adjusting screw 166, I locate parallel with, and at the side of same, a locking screw 167 the heads of said screws being reversely coned or tapered as shown at 168 and 169, so that after the screw 166 has been properly adjusted to position the shear blade, the screw 167 may be tightened in order to lock the screw 166 against movement.

As shown in Fig. 22, the shear pins 158, 159, 160 and 161 are located coaxial with the helicals, the pins 158 and 159 being contained within the entrance ports in parts 155 and 156 while the pins 160 and 161 are contained within bores formed as extensions of the die cavities and located in removable blocks 170 and 171 secured in housing 141. In order to hold the said shear pins in place, the parts 155, 156, 170 and 171 are split in half so that the respective halves of said blocks can be tightened down upon the shear pins by cap screws as indicated at 172. It will be observed that the shear pins 158 and 159 do not interfere with the passage of the helicals 146 and 147 by reason of the helical grooves surrounding said pins.

The die block 144 is slid or moved longitudinally of its axis, i. e., horizontally by the following mechanism. Referring to Fig. 1, it will be observed that in front of the machine and on the top of the main frame 30, there is secured a bracket 173 having an upstanding lug 174 which lug is slotted out horizontally to receive a slide bar 175. Said slide bar 175 is normally drawn toward the front of the machine by means of a strong coiled tension spring 176, the rear end of which is connected to a small bracket 177 bolted to the side of the slide bar 175, while the front end is connected adjustably to a small lug or extension 178 on the front and upper end of bracket 173. The slide bar 175 is in alignment with the center of the die block 144, and, as perhaps shown best in Fig. 5 is made with a head portion 179 having a stem 180 secured thereto or formed therewith. Said stem 180 is turned off to form a reduced portion 181 which is a press fit in a bore 182 in the center of die block 144, the shoulder 183 on said stem portion 180 engaging the outer end of said die block 144.

The said slide bar 175 is moved inwardly by means of a radial cam 184 keyed to the main cam shaft 56. The track surface of said cam 184 engages a roller 185 mounted to revolve on a pin 186 carried by the upper end of an upstanding cam lever 187, the lower end of said cam lever 187 being pivoted on a transverse shaft 188 carrying the bottom of main frame 30. The upper end of the cam lever 187 is made with a rectangular lug 189, which lug engages a roller 190 pivoted on a pin 191 carried by the head 179 of a slide bar 175.

During the coiling and forward travel of the helicals, the die parts 144 and 145 are slightly spaced to facilitate entrance of the helicals and while the helicals are being cut off and having their ends trimmed by longitudinal movement of the die 144, the die portion 145 is held up against and in intimate contact with die portion 144. The only time at which the die portions 144 and 145 are in the relative position as shown in Fig. 21, is upon the discharge of the completed twinned helical. The movement of the die portion 145 to cause it to move with or relative to die part 144 is controlled by a rod 192 aligned with the die head and coaxial with stem 180. The said rod 192 is reduced in diameter to form a shoulder 193 and a stem 194 which is a press fit in the die portion 145. On the rear end of rod 192 there are a pair of adjustable collars 195 and 196 between which there is interposed a grooved sleeve 197 pivotally connecting with pins 198 on the upper end of the upstanding lever 199. The lever 199 is pivoted on a shaft 200 transversely carried by the lower portion of the bed frame 30 and is connected by means of a horizontal link 201 to another upstanding lever 202, the lower end of which is pivoted on shaft 188. The upper end of said cam lever 202 is equipped with a cam roll 203 which engages the track surface of a radial cam 204 keyed to main cam shaft 56. The spring 204$^a$ serves to hold the cam roll 203 in engagement with cam 204 and to move said lever 202 to the right when permitted to do so by said cam 204.

Preferably in order to permit free movement of the ends of the helicals into the dies or molds, the cams 184 and 204 which control respectively the die portions 144 and 145 are so arranged as to hold the said die parts slightly spaced during the inward feed of the wire and while said die parts are in the extreme right hand positions. As soon as the feed of the wire is arrested and when the dies begin to move, the dies close up and grip the helicals so as to prevent the latter from moving during the subsequent severing and bending operations.

In completing the article, after the twinned helicals have been cut off and trimmed, I first form hooks on the ends of the springs by first bending over at right angles or into substantial coincidence with an axial plane, the terminal half convolution at each end of each spring, the angle of said bend being shown in Fig. 25, the hook as so formed on the end of said spring being indicated at dotted lines as at 205 in Fig. 27. Subsequently the open hooks, as indicated at 205 in Fig. 27 are partially closed or contracted by a subsequent bending operation until they assume the shape shown in full lines in Fig. 27. Both of said bends are effected by means of parts cooperating with the left hand die portion 145.

Referring to Figs. 10 and 20, it will be observed that the housing 140 is formed with a rectangular guideway substantially the same as the guideways formed in the stationary head 141 so that sliding movement of the die half 145 is permitted therein, it being understood that the parts 144 and 145 of the die are of the same cross section and aligned with each other. The die half 145 is additionally milled or planed out on its four outer sides to slidably receive a set of four plungers 206 parallel with the die axis and of rectangular cross section as shown best in Fig. 10. The housing 140 is also grooved out as indicated in Figs. 10, 13 and 20 to form a partial support or guideway for the four bending plungers 206. Said bending plungers 206 are all adjustably connected at their outer ends by means of screws 208 to the flange 209 on the end of a sleeve 210 sliding on shaft 192. The end of said sleeve 210 is equipped with a pair of adjustable collars 211 and 212 between which fits a short sleeve 213 pivotally connected as at 214 to the upper end of an upstanding cam lever 215 pivoted on shaft 216 transversely carried in the lower part of frame 30. The lever 215 is connected by a link 217 to an upstanding cam lever 218, the lower end of which is pivotally carried by shaft 188. In the upper end of said lever 218 there is mounted a pin 219 carrying cam roll 220 which rolls on the track surface of a radial cam 221 also keyed to the main cam shaft 56. A spring 221$^a$ serves to hold cam roll 220 in engagement with cam 221 and to move cam lever 218 to the right when permitted by cam 221.

After the twinned helicals have been formed, interlaced and their ends cut off, the raised surface of cam 184 causes the right and left hand dies to move to the left as indicated in Fig. 20, plunger 192 which carries the left hand die being at the same time also positively moved to the left by the raised surface of cam 204. The movement of the entire die structure to the left is effected when cam roll 185 moves up the sloping surface 222 of cam 184, the entire die structure remaining in the left hand position as indicated in Fig. 20, while the roll 185 passes over the raised or concentric portion 223 of said cam 184. During said latter period of rest, the hooks are formed and subsequently bent. The formation of the hooks is effected by means of anvils carried on the ends of plungers 206 which cooperate with certain movable rotary bending devices, which will be described shortly. It will be understood that the bending plungers 206, during the movement of the die structure to the left and during the time that the initial bending of the hooks is being effected, do not move, but occupy the positions shown in Figs. 19, 20 and 14.

The initial formation of the hooks is shown best in Figs. 10 and 13, and is effected by a rotary movement of a rock ring 224 which carries a set of four benders as at 225. The rock ring 224, as indicated also in Fig. 20, is journaled on a reduced or shouldered portion of the left hand portion 140 of stationary bracket 139. The ring 224 is slipped onto said reduced portion 226 from the right and held in place by means of the retaining ring 227, which has been removed in illustrating Figs. 10 and 13. The rock ring 224 is actuated by reciprocating the rod 228, the upper end of which is enlarged and apertured to admit a pin or bolt 229 fixed to the side of rock ring 224. The lower end of said rod 228 is pivotally connected to a pin 230 in the end of the horizontal arm 231 of a bell crank pivoted on a fixed stud 232 (see Fig. 5). At the upper extremity of the vertically extending upstanding arm 233 of said bell crank, there is a pin 234 on which there is pivotally carried a cam roll 235 engaging the cam surface of a radial cam 236 also keyed to the shaft 56. The rotation of the rock ring 224 and consequent bending of the hooks is indicated in Fig. 13 and occurs when the cam roll 235 is engaged by the projection 237 of said cam 236.

The actual first bending of the end coils of the springs to form the hooks thereon is effected upon anvils 238 as shown best in Fig. 13 which are formed by notching or routing out the ends of the plungers 206. As is well shown in Figs. 14 to 16 inclusive, said routs 239 are made large enough to receive the end half coils 240 of the spring when the latter is bent down upon the anvil 238 by the bender. It will be observed that the inclination of the anvil 238 is such that the end coil of the spring is bent beyond a right angle, thereby allowing for a certain amount of resiliency of the wire upon which the springs are made. Each of the benders 241 comprises a somewhat L-shaped plate, the tail 242 of which is secured in the rotary rock ring 224. In order to hold each bender 241 rigidly in said rock ring 224, the tail 242 of each bender is made of dove tailed shape as shown best in Figs. 11 and 12 to fit a correspondingly shaped guideway milled or planed in the side of the rock ring 224. Clamping of the bender on the rock ring is effected by means of a pair of cap screws 243 the heads of which are coned or tapered as indicated at 244 in Figs. 11 and 12 in order to fit the bevelled edge 245 of the dove tailed part 242 of the bender. Longitudinal adjustment of the bender is effected by means of a longitudinally extending screw 246, set close enough to the dove tailed slot in the locking ring to permit the edge of the large flat head 247 of said screw 246 to overhang the bottom edge of the dove tail 242.

The operative portion of the bender 241 comprises the toe 248 on the foot part 249, said toe being made narrow enough to enter the rout 239 as shown in Fig. 13, and being made with a small projecting tip or point 250 adapted to enter behind the top of coil 240 and thus to facilitate the bending of same when the rock ring is rotated into the position shown in Fig. 13.

After the end half coils have been bent at right angles to form hooks therein, the rock ring 224 is returned to its normal position, shown in Fig. 10, by means of a coil spring 251 connected behind the arm 231 of the cam mechanism and a stationary eyebolt 252 (see Fig. 1), and the product of the machine is then completed to the extent that the machine has made a pair of helicals interlaced in cruciform relation and with hooks formed on each end for connecton to other parts of the structure for which the article is destined to be used.

However, I prefer, at this time, to perform an additional operation on each of the hooks for the purpose of saving an operation on each of the hooks when the cruciform helicals are assembled at a later time. Said operation comprises the bending of each of the hooks from the shape shown in Fig. 14 to the shape shown in Figs. 15, 26 and 27. Said further formation or bending of the hooks is accomplished by a short relative movement of the plunger 206 and the die structure. This is preferably done by moving the plungers 206 a short distance to the left, which occurs when the cam roll 220 is engaged by the projection 253 on cam 221. At this time the hooks 240 are about to be released by the bending toes 248. By inspection of Figs. 14, 15 and 16, it will be observed that in order to effect proper bending of the ends of the hooks into the position shown in Fig. 15, the rout 239 is made with a depression 254 the end of which is made rounded to receive the coil 240, and undercut as shown at 255 so as to prevent the coil from slipping past the forming shoulder 256 which applies such final bending to the hook. After both bends have been formed, the rock ring reassumes the position shown in Fig. 10 and the anvil plungers 206 are moved to the right by reason of cam roll 220 dropping onto the portion 256 of cam 221. The releasing of the completed article from the die structure is then effected by maintaining the advanced position of the left hand die structure 145 and partially withdrawing the right hand die structure 144 to a position as shown in Fig. 21. This occurs when the cam roll 185 drops down the slope 257 of cam 184. The movement of bar 175 to the right in retracting the right hand die structure 144 also serves to discharge the completed article from the left hand die structure 145 by the following connections. Referring to Fig. 5, it will be seen that to bar 175 there is connected by means of bolts as at 258 a yoke or arched connecting bar 259 which extends over the bracket 139 and is provided with a fork 260. The fork 260 is connected by means of pins or bolts 261 to a sleeve 262 coaxial with and slidable upon the sleeve 210 and to the inner face of the said sleeve 262 there are secured a set of four knock-out pins or plungers 263 which extend through suitable clearance apertures in the flange 209 and slide in bores 264 bored longitudinally in the body of the left hand die structure 145. Said plungers 263, as indicated best in Figs. 10 and 13, are positioned behind the ends of the twinned helicals so that when said plungers are advanced relative to the completed spring, the latter will be discharged from the helical grooves in the left hand die member (see Fig. 21).

In order to insure that the finished product is positively and freely discharged from the machine and to prevent the hooks from sticking in the depressions 254 of the routings 239 in the plunger anvils, I prefer to jog the latter endwise at the time or slightly before the time that the knock out pins 263 engage the springs. This jogging action is effected by forming the surface of the cam 221 with a plurality, in this instance two, steps or waves 265 (see Fig. 5).

While I have shown and described my invention in a preferred form, the details of construction and operation are merely illustrative of a single phase of my invention, the scope of which should be determined by reference to the appended claims, said claims being construed as broadly as possible, consistent with the state of the art.

I claim as my invention:

1. The improvement in the art of making a spring structure comprising a pair of helicals mutually interlaced in cruciform relation, which consists in simultaneously forming a length of wire into the shape of a helical coil, the end portion of said coil forming one of said helicals, and screwing the end of said helical transversely through spaces between turns of the other helical.

2. The improvement in the art of making a spring comprising a pair of helicals mutually interlaced in twinned cruciform, relation which consists in simultaneously forming the ends of two continuous lengths of wire into the shape of helical coils, the end portions of said coils forming said helicals, and screwing the ends of said helicals together in transverse relation so that the turns of said helicals will be mutually interlaced with the ends of each helical extending beyond the point of interlacement.

3. The improvement in the art of making a cruciform helical which consists in supporting the helicals with their axes lying substantially in the position ultimately to be occupied by the same, preventing movement of the turns of said helicals with respect to each other, rotating each of the helicals around its axis whereby each helical as a whole will be advanced longitudinally of its axis and continuing such rotary movement until the helicals have become threaded or interlaced together.

4. The improvement in the art of making cruciform helicals which consists in forming a length of wire into the shape of a helical coil, the end portion of said coil forming one of said helicals, helically advancing the end of said helical in a direction longitudinally of its axis, and transversely through spaces between turns of the other helical and subsequently severing said end portion.

5. The improvement in the art of making cruciform springs which consists in forming two lengths of wire into the shape of helical coils, the end portions of said coils forming helicals which are to be united together in interlaced relation, helically advancing the ends of said helicals longitudinally of their respective axes, but respectively transversely relative to the axes of the other helicals so as to mutually interlace the said helicals and subsequently severing said end portions.

6. The improvement in the art of making helical springs which consists in feeding forward the end of a continuous wire supply, simultaneously bending same to form a helical coil positioning said coil, cutting off a fraction of said coil, trimming surplus material from the end of the coil and subsequently bending the cut and trimmed ends to form hooks thereon.

7. The improvement in the art of making helical springs which consists in positioning the end of a helical, bending the same to form a hook thereon, and while said helical is still positioned, bending the end of said hook to contract the same.

8. The improvement in the art of making a helical spring which consists in positioning a helical simultaneously bending the ends of said coil to form hooks thereon lying in substantially the same plane, and while maintaining the hooks in said plane, simultaneously applying inward pressure against the terminal portion of each of said hooks to contract the same.

9. The improvement in the art of making a helical spring which consists in simultaneously advancing and bending the end of a continuous wire supply so as to form a continuous helical, arresting said advance and positioning the end portion of said helical, severing said end portion from the continuous wire supply and subsequently, while said helical is so positioned, bending the terminal portions of said end portion to provide a hook at each end thereof, and, while still so positioned, contracting said hooks so as to partially close the same.

10. The improvement in the art of making cruciform helicals which consists in advancing the ends of two separate continuous wire supplies, simultaneously bending same to form helical coils thereon, and helically advancing said helicals into position with their axes arranged at an angle to each other and in laterally offset planes, while preventing relative movement of adjacent turns of the respective helicals, thereby to interlace said helicals in cruciform relation.

11. The improvement in the art of making cruciform helicals which consists in advancing the ends of two separate continuous wire supplies, simultaneously bending same to form helical coils thereon, helically advancing said helicals into position with their axes arranged at an angle to each other and in laterally offset planes while preventing relative movement of adjacent turns of the respective helicals, thereby to interlace said helicals in cruciform relation, subsequently severing said interlaced portions from the continuous wire supply, trimming the forward end of each helical and bending hooks on the ends of said helicals.

12. The improvement in the art of making cruciform helicals which consists in advancing the ends of two separate continuous wire supplies, simultaneously bending same to form helical coils thereon, helically advancing said helicals into position with their axes arranged at an angle to each other and in laterally offset planes, while preventing relative movement of adjacent turns of the respective helicals, thereby to interlace said helicals in cruciform relation, subsequently severing said interlaced portions from the continuous wire supply, trimming the forward end of each helical and bending hooks on the ends of said helicals, afterward contracting the hooks to partially close the same.

13. The improvement in the art of making cruciform helicals which consists in advancing the ends of two separate continuous wire supplies, simultaneously bending same to form helical coils thereon, helically advancing said helicals into position with their axes arranged at an angle to each other and in laterally offet planes, while preventing relative movement of adjacent turns of the respective helicals, thereby to interlace said helicals in cruciform relation, subsequently severing said interlaced portions from the continuous wire supply, trimming the forward end of each helical and bending hooks on the ends of said helicals, afterward contracting the hooks to partially close the same, the forward helical movement of the helicals being arrested during the severing, trimming, hook-bending and hook-contracting operations.

14. In combination, means for propelling and simultaneously bending the end of the wire to form a continuous helical coil, a cutting member arranged within said coil, an external support for a portion of said coil, said support being provided with a cutting member adapted to cooperate with said internal cutting member, and means for effecting a relative movement of said support and said cutting member in a direction transverse to the axis of the helical, thereby cutting off a portion of said coil.

15. The improvement in the art of making helicals with hooks on the ends thereof which consists in propelling and simultaneously bending the end of a wire to form a helical coil, arresting the feeding of the wire while the helical is still connected thereto, positioning the helical, severing the same from the wire at one end of the helical and trimming the other end of the helical and forming a hook at each end thereof.

16. In combination, a structure having a pair of internally threaded bores adapted to receive and position a pair of interlaced helical springs having axes located in offset planes and at an angle to each other, said structure being made in a plurality of parts separable to permit removal of the interlaced springs from the structure, and means for feeding springs into said structure.

17. The improvement in the art of making helicals with hooks on the ends thereof which consists in propelling and simultaneously bending the end of a wire to form a helical coil, arresting the feeding of the wire while the helical is still connected thereto, positioning the helical, severing the same from the wire at one end of the helical and trimming the other end of the helical and forming a hook at each end thereof, while the helical is still positioned.

18. In combination, a support provided with a helical formation for receiving and positioning a coiled wire spring, means for bending the ends of the spring to form hooks thereon and means for contracting said hooks.

19. In combination, a support provided with a helical formation for receiving and positioning a coiled wire spring, means for rotating said spring to feed said spring into engagement with said helical support and means for bending the ends of the coil to form hooks thereon.

20. In combination, a support provided with a helical formation for receiving a coiled wire spring, means for rotating said spring to feed the spring into engagement with said formation to position said spring, means for cutting material from the ends of said spring while positioned on said support and means for subsequently bending the trimmed ends of the coil to form hooks thereon.

21. In combination, a mold provided with a helical aperture, means for rotating a wire helical to feed the helical into said aperture, and means for forming hooks on the ends of said helical while in said mold.

22. In combination a mold provided with a helical conduit for receiving a wire helical, a knife positioned and fastened within said helical conduit and means cooperating with said knife for severing a helical fed into said mold.

23. In combination a mold provided with a channel therein, a helical groove being formed within said channel and a member secured in said channel provided with a cutting edge, and a member movable relative to said cutting edge for severing the end from a helical positioned in said groove.

24. In combination a mold provided with a channel therein, a helical groove being formed within said channel and a member in said channel provided with a cutting edge, a member movable relative to said cutting edge for severing the end from a helical positioned in said groove, said first named member being positioned within said helical groove by being gripped by the threads in said channel forming said groove.

25. In combination, a mold provided with a cylindrical channel therein, a rod gripped by the wall of said channel and having a cutting edge on one end and extending out of said channel and a member cooperating with said cutting edge for serving a helical surrounding the latter, said cylindrical channel being provided with an internal thread for receiving and positioning a helical introduced into said channel, and means for introducing said helical thereinto.

26. In combination, a mold provided with a cylindrical channel therein, a rod gripped by the wall of said channel and having a cutting edge on one end and extending out of said channel and a member cooperating with said cutting edge for serving a helical surrounding the latter, said cylindrical channel being provided with an internal thread for receiving and positioning a helical introduced into said channel, and means for feeding a helical helically into said channel.

27. In combination, a relatively stationary support provided with a channel having an internal helical groove for positioning a coiled wire spring, a relatively movable member provided with an opening constituting an extension of said channel and also provided wtih a cutting edge, a cutting member carried by the support located within said helical groove and cooperating within said cutting edge, means for feeding a wire helical through the groove of said support into said movable member and means for effecting relative movement of said support and member to sever said helical.

28. In combination, a relatively stationary support provided with a channel having an internal helical groove for positioning a coiled wire spring, a relatively movable member provided with an opening constituting an extension of said channel and also provided with a cutting edge, a cutting member carried by the support located within said helical groove and cooperating within said cutting edge, means for feeding a wire helical through the groove of said support into said movable member and means for effecting relative movement of said support and member to sever said helical, a second knife on said stationary support and a second cutting edge on the movable member both aligned with the end of the helical for trimming the forward end of the latter.

29. In combination, a relatively stationary support provided with a channel having an internal helical groove for positioning a coiled wire spring, a relatively movable member provided with an opening constituting an extension of said channel and also provided with a cutting edge, a cutting member carried by the support located within said helical groove and cooperating within said cutting edge, means for feeding a wire helical through the groove of said support into said movable member, means for effecting relative movement of said support and member to sever said helical, and means for intermittently feeding a continuous helical helically into said groove.

30. In combination, a relatively stationary support provided with a channel having an internal helical groove for positioning a coiled wire spring, a relatively movable member provided with an opening constituting an extension of said channel and also provided with a cutting edge, a cutting member carried by the support located within said helical groove and cooperating within said cutting edge, means for feeding a wire helical through the groove of said support into said movable member, means for effecting relative movement of said support and member to sever said helical, and means for intermittently feeding a continuous helical helically into said groove comprising intermittently operating propelling means and bending means for forming from a length of wire a helical and at the same time helically advancing the same into said support.

31. In combination, a relatively stationary support provided with a channel having an internal helical groove for positioning a coiled wire spring, a relatively movable member provided with an opening constituting an extension of said channel and also provided with a cutting edge, a cutting member carried by the support located within said helical groove and cooperating within said cutting edge, means for feeding a wire helical through the groove of said support into said movable member and means for effecting relative movement of said support and member to sever said helical, means for intermittently feeding a continuous helical helically into said groove comprising intermittently operating propelling means and bending means for forming from a length of wire a helical and at the same time helically advancing the same into said support, said bending means being adjacent said support thereby to reduce to a minimum the variations in the lengths of the severed helicals.

32. In combination, a die structure comprising a pair of separable parts, said parts being provided at their point of separation with an internally threaded cylindrical channel parted by the separation planes, a support provided with a guideway permitting slidability of said die structure in a direction substantially at right angles to the axis of the channel, said support being provided with a feed channel constituting an extension of said die channel and similarly threaded, a rod supported in said support channel by the threads of the latter, a cutting edge on the outside of said die structure and movable therewith, means for feeding a helical through said support channel with its end extending into the die structure and means for effecting sliding movement of said die structure to sever said helical.

33. In combination, means for propelling the ends of a pair of continuous wire supplies, means for bending same to form helical ends on said wires, a die structure having two separable parts joined at two parallel but offset planes, and provided with axially angulated bores respectively longitudinally divided by said planes for receiving said helical end portions, said bores being provided with internal threads for separating and positioning the convolutions of the helicals and located so as to cause the helicals to become mutually interlaced when helically introduced into said bores.

34. In combination, a support having a helical groove formed therein for receiving a coiled wire spring, means for rotating said spring to feed said spring into said groove, means for trimming the ends of the coil and means for bending the ends of the coil to form hooks thereon.

35. In combination, a structure having a pair of internally threaded bores adapted to receive and position a pair of interlaced helical springs having axes located in offset planes and at an angle to each other, said structure being made in a plurality of parts separable to permit removal of the interlaced springs from the structure, and means for simultaneously inserting a pair of springs into said bores.

JOHN F. GAIL.